Figure 1:
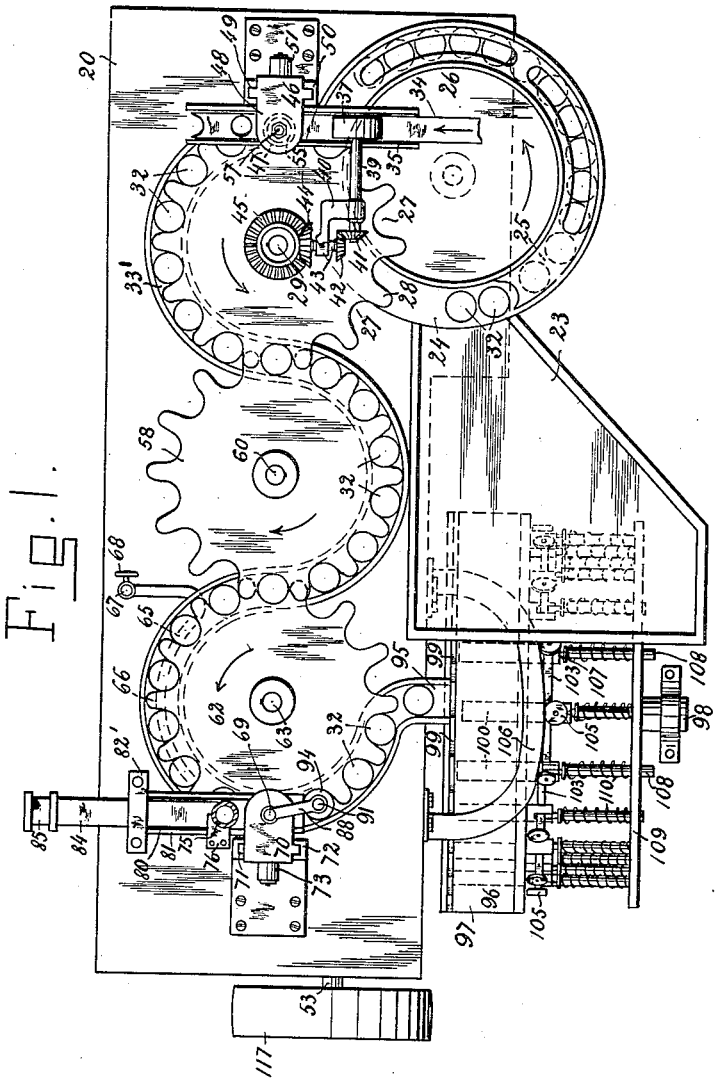

A. BOGDÁNFFY.
PROCESS OF MANUFACTURING BOTTLE CLOSURES.
APPLICATION FILED SEPT. 9, 1911. RENEWED AUG. 7, 1912.

1,053,898.

Patented Feb. 18, 1913.

4 SHEETS—SHEET 1.

WITNESSES
W. Klink.
S. Birnbaum

INVENTOR
Alex Bogdánffy
by Sigmund Herzy
his ATTORNEY

A. BOGDÁNFFY.
PROCESS OF MANUFACTURING BOTTLE CLOSURES.
APPLICATION FILED SEPT. 9, 1911. RENEWED AUG. 7, 1912.

1,053,898.

Patented Feb. 18, 1913.
4 SHEETS—SHEET 3.

WITNESSES
S. Birnbaum
L. Klink.

INVENTOR
Alex Bogdánffy
BY
Sigmund Herzog
his ATTORNEY

A. BOGDÁNFFY.
PROCESS OF MANUFACTURING BOTTLE CLOSURES.
APPLICATION FILED SEPT. 9, 1911. RENEWED AUG. 7, 1912.
1,053,898.
Patented Feb. 18, 1913.
4 SHEETS—SHEET 4.
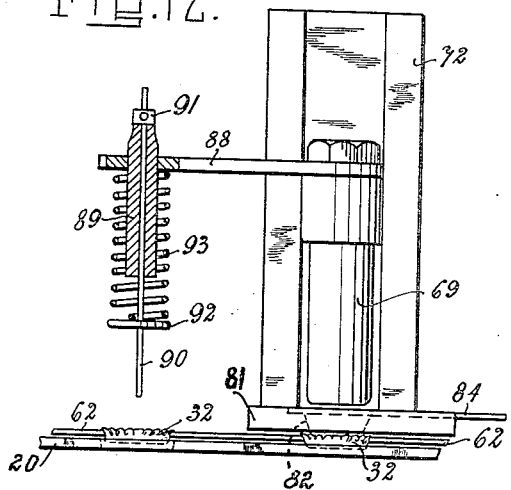
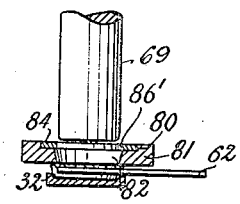
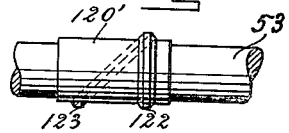
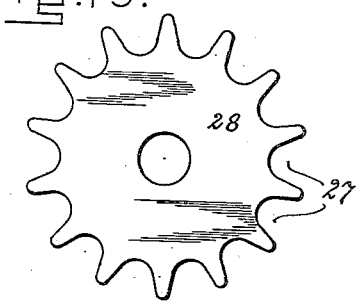
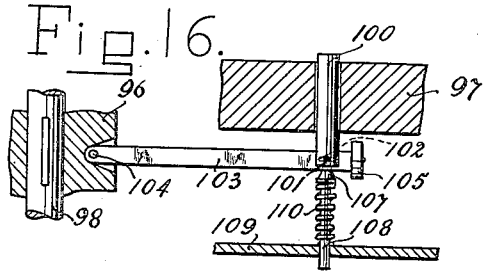
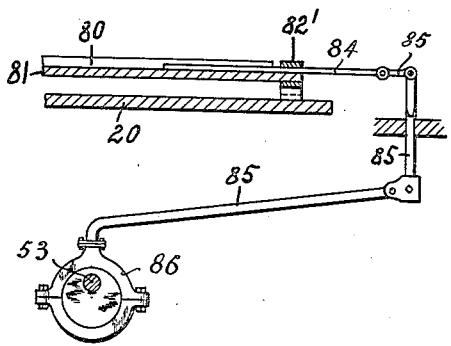

UNITED STATES PATENT OFFICE.

ALEXANDER BOGDÁNFFY, OF NEW YORK, N. Y., ASSIGNOR TO INTERNATIONAL CORK COMPANY, OF BROOKLYN, NEW YORK, A CORPORATION OF NEW YORK.

PROCESS OF MANUFACTURING BOTTLE-CLOSURES.

1,053,898.

Specification of Letters Patent. Patented Feb. 18, 1913.

Original application filed May 27, 1911, Serial No. 629,871. Divided and this application filed September 9, 1911, Serial No. 648,502. Renewed August 7, 1912. Serial No. 713,942.

*To all whom it may concern:*

Be it known that I, ALEXANDER BOGDÁNFFY, a subject of the King of Hungary, and resident of the city of New York, in the county of Kings and State of New York, have invented certain new and useful Improvements in Processes of Manufacturing Bottle-Closures, of which the following is a specification, the same being a division of application Serial No. 629,871, filed May 27, 1911.

The present invention relates to a process for the manufacture of bottle closures of the class known as "crown cork sealing caps or closures." Closures of this type comprise usually three parts, that is a metallic cap or crown, having a corrugated flange to be locked to the exterior of the bottle neck, a sealing disk or packing of cork or the like, and a disk of impervious binding material interposed between the metallic cap and the cork disk. These caps have been manufactured heretofore in the following manner: The three parts mentioned are assembled and the closure, as a whole, is then subjected to heating action, whereby the interposed impervious binding material is softened or fused so that, when pressure is applied to the closure, the impervious binding medium will firmly unite the packing disk with the metallic cap or crown. This process of manufacture has, however, several defects, to wit: The packing disks are liable to be injured by the heating action, no matter whether they are of cork or of a composite type. If cork sealing disks are employed, they will lose to some degree their toughness, or in other words they will become brittle, whereby the sealing properties of the same will be impaired to a great degree. If, on the other hand, sealing disks of a composite type are used, they might be rendered entirely useless for the reason that they contain a fusible material, which is, of course, affected by the heat. Another defect of the process of manufacture hereinbefore mentioned consists in that, when the parts are assembled, the diameter of the metallic cap is slightly reduced so as to grip the sealing disk. When now, after the assembling, the closure is heated, the moisture and air between the members of the closure cannot escape. Moreover, when then the parts are subjected to heating action, the air will be expended and act as a cushion, as it were, when the closure is subjected to pressure, and thus prevent a firm union between the parts thereof.

The object of the present invention is to obviate these defects mentioned, and with this and other objects in view, which will appear as the nature of the invention is better understood, the same consists in the process hereinafter fully described, and pointed out in the appended claim.

One of the many possible apparatus for carrying out the process forming the subject of the present application for Letters Patent is illustrated in the accompanying drawings, in which:—

Figure 2:
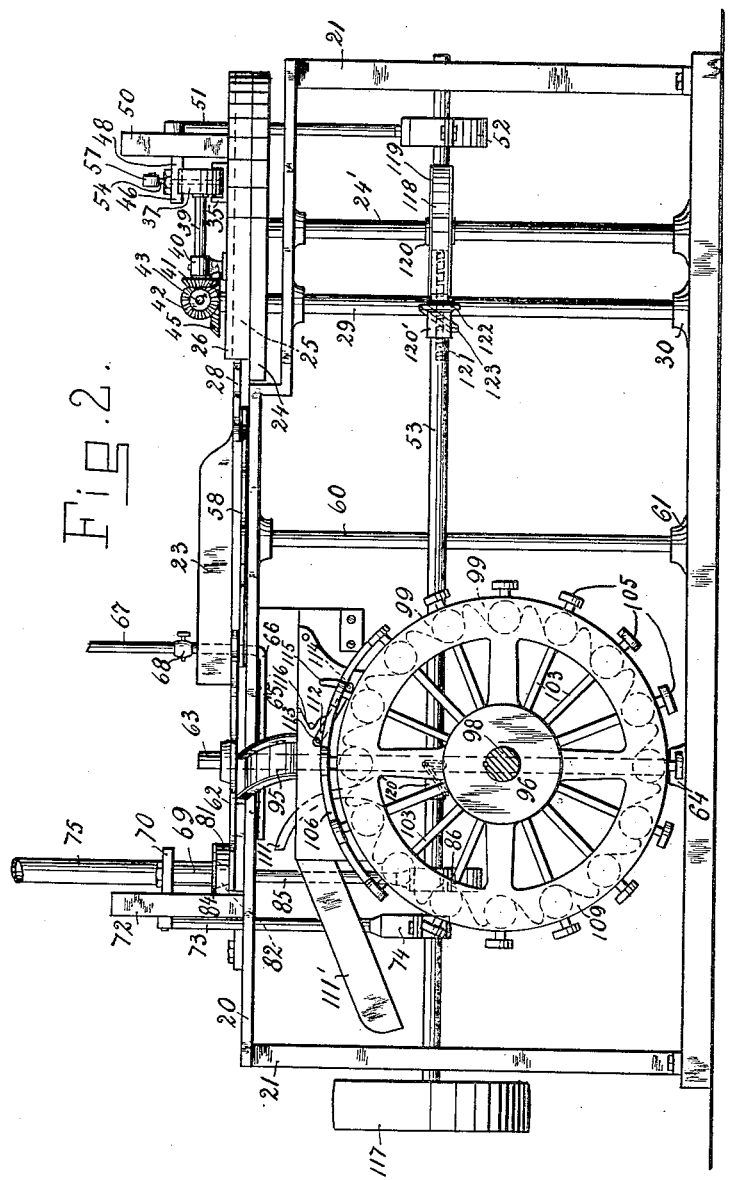
Figure 3:
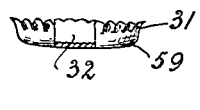
Figure 4:
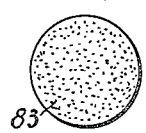
Figure 5:
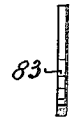
Figure 6:
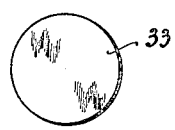
Figure 7:
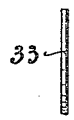
Figure 8:
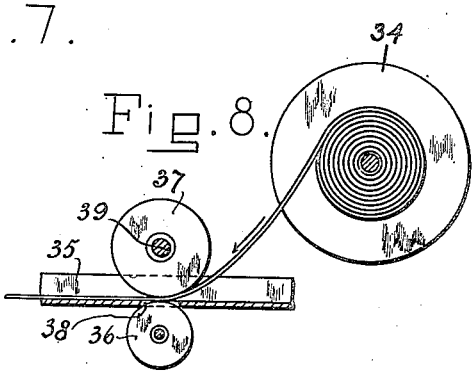
Figure 9:
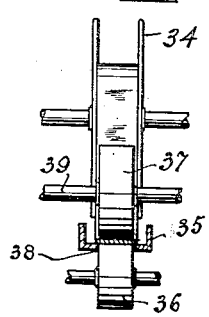
Figure 10:
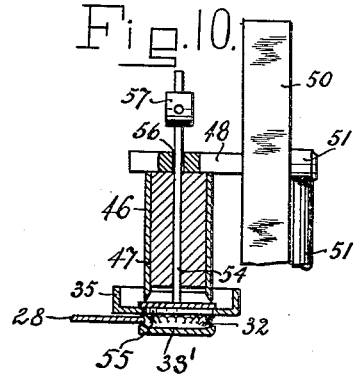
Figure 11:
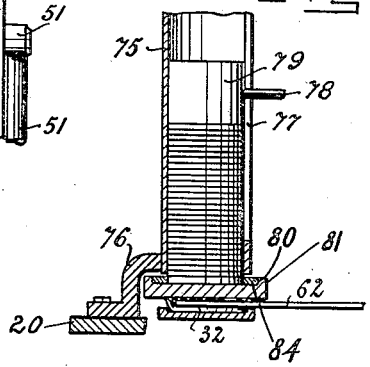

Figure 1 is a plan view of a device constructed in accordance with the present invention; Fig. 2 is a front elevation thereof; Fig. 3 is a sectional view of a metallic cap inverted or in the position in which it passes to the machine ready to receive the other parts of the composite sealing closure; Fig. 4 is a plan view of the sealing disk of the closure; Fig. 5 is a front elevation thereof; Fig. 6 is a plan view of an impervious binding disk which is inserted into the metallic cap; Fig. 7 is a front elevation thereof; Fig. 8 is a sectional view of the means for feeding the strip of paper from which the binding disks are cut out; Fig. 9 is a front elevation of the device shown in Fig. 8; Fig. 10 is a vertical section taken through the means for cutting the strip of paper; Fig. 11 is a vertical section taken through the sealing disk holding means; Fig. 12 is a side elevation, partly in section, of the means for forcing the sealing disk into the metal cap; Fig. 13 is a sectional view of the means for conveying the sealing disk to the metallic cap; Fig. 14 is a detail view of a worm for intermittently rotating the transporting means of the device; Fig. 15 is a plan view of a transporting wheel; Fig. 16 is a detail of construction of the pressure applying means of the apparatus; and Fig. 17 is a side elevation of a further detail of construction.

In the drawings, the numeral 20 indicates a horizontal table, which is supported by legs or standards 21, the latter being attached in any suitable manner to the floor. Above the plane of the table 20 is arranged a substantially horizontal support 23 onto which the metallic caps are placed in their inverted positions, to be passed manually to a continuously rotating carrying disk 24, which conveys the caps, one after the other, along a channel 25 in the direction of the arrow indicated in Fig. 1 of the drawings, which channel is formed between the said carrying disk 24 and a cover plate 26. This cover plate is attached to the table 20 in any suitable manner. The carrying disk 24 feeds the inverted caps or crowns one after the other to the recesses 27 of a star wheel 28, which is attached to a vertical shaft 29, journaled in the table 20 and in a bearing 30. To this shaft intermittent rotary motion is imparted in the direction of the arrow by means which will be hereinafter described. The star wheel 28 overlies partly the carrying disk 24, engages the flange portions 31 of the caps 32, and conveys them along a groove 33' in the table 20 to rest directly beneath the means which cuts the impervious binding disk 33 from a strip of suitably prepared paper or other material, and places the disk into the inverted cap.

The paper strip, from which the disks 33 are cut, is wound upon a reel 34, which is suitably journaled in the frame of the machine, and from which the strip is conducted into a guide 35 to pass between the feeding rollers 36 and 37. The feeding roller 36 is journaled in the frame of the machine and projects through a slot 38 in the guide 35 above the lower plane of the latter, while the spindle 39 of the roller 37 is journaled in a bearing 40, and carries at its outer end a bevel gear 41, meshing with a similar gear 42 upon the shaft 43, upon the opposite end of which is mounted another bevel gear 44 in mesh with a similar gear 45, which latter is attached to the shaft 29 of the star wheel 28. It will be observed that the feeding rollers 36 and 37 will thus rotate intermittently, and advance the paper strip to the cutting means 46. The cutting means comprises a tubular cutter 47, secured in any suitable manner to an arm 48, which is slidably arranged in a vertical guideway 49 of a bracket 50, attached to the table 20. The arm 48 is pivotally engaged by a rod 51, which is fastened to the strap of an eccentric 52, the latter being mounted upon the main driving shaft 53 of the machine. The driving shaft is journaled in bearings, which are secured to or made integral with the standards or legs 21. As the paper disk is cut from the strip, it will be automatically forced, upon the upward movement of the cutter 47, by a stem 54 through a hole 55 in the guide 35 into the metallic cap. The stem 54 projects through an opening 56 of the arm 48 above the plane of said arm and carries upon its upper end a weight 57. When therefore the cutter 47 moves upward, the weight 57 will force the stem 54 downward and thereby the paper disk into the cap. After this, upon the further upward movement of the arm 48, the latter will engage the weight 57 and lift thus the stem 54 out of the hole 55 in the guide 35. The paper disk having been deposited in the metal cap, the latter will be transported by the wheel 28 within the reach of a star wheel 58, which rotates in a direction opposite to that of the star wheel 28 and lies in a plane below that of the wheel 28, engaging thus the heads 59 of the metal caps 32. The star wheel 58 is mounted upon a shaft 60, which is suitably journaled in the frame and in a bearing 61. The caps and paper disks are by the wheel 58 brought within the reach of a third star wheel 62. This star wheel overlies partly the wheel 58 and engages the metal caps at their flange portions 31, transporting the same intermittently to the means which force the sealing disks into the caps. The star wheel 62 is attached to a shaft 63, mounted in the frame of the machine and in a bearing 64. This shaft moves also intermittently, and is actuated also from the main driving shaft 53 in a manner hereinafter to be specified. While being transported by the wheel 62, the caps and the binding disks therein are heated by a suitable heating means, for instance a gas heater 65. This heater comprises a perforated tubular member 66, connected with the gas supply pipe 67, the communication being controlled by a valve 68. This heater is, preferably, arranged below the table 20. The heat is transmitted to the binding disks by the metal caps directly in contact with the table. The binding material is thus fused or softened for the purpose of uniting the sealing disk to the cap, and for other well known purposes. After heating, the caps are transported by the wheel 62 to an assembling plunger 69, attached to an arm 70, which is slidably arranged in a vertical guide 71 of a bracket 72. The arm 70 is pivotally connected with a rod 73, which is fastened to the strap of an eccentric 74, the latter being keyed to the main driving shaft 53. The sealing disks are placed into a substantially vertical tube 75, which is attached to the table 20 by means of a bracket 76 or otherwise, and is provided with a longitudinal slot 77 through which a finger piece 78 of a weight 79 protrudes, said weight being placed on the sealing disks, and serves to feed the said disks into a guideway 80 of a plate member 81, which is attached to the table by a bracket 82' in a plane above the plane of the star wheel 62. The plate 81 is provided with an aperture 82 in alinement with the plunger 69. This aperture tapers toward the plane of the wheel 62, its upper diameter being larger than the diameter of a sealing disk 83, and the diameter at its lower end being somewhat smaller than that of a sealing disk. The purpose of this arrangement will be explained presently. The sealing disks are conveyed in the guideway 80 from below the tubular member 75 to the aperture 82 by a reciprocatable conveyer 84, which is slidably arranged in the guideway 80, and connected by a plurality of links and rods 85, 85 with the strap of an eccentric 86, which is keyed to the main driving shaft 53 of the machine. The conveyer 84 is provided with a recess 86', which engages the sealing disk in transferring the same to the aperture 82. Obviously the angular relation of the eccentrics 74 and 86 must be such that when the plunger 69 is lifted, the conveyer 84 will move inward and transfer thereby a sealing disk within the reach of the plunger 69, which, in its downward movement, will force the cork disk through the aperture 82 into the metal cap. It should be noted that since the diameter of the lower end of the aperture 82 is smaller than that of the sealing disk, the latter will be compressed to some extent and, when forced into the cap, will expand and be held thus firmly in the cap.

As it happens sometimes that one or the other of the recesses in the star wheel 62 does not contain a metal cap, it becomes necessary to eject the sealing disk from that recess after it has passed the plunger 69. For this purpose the plunger 69 carries a bracket 88, to which a downwardly extending tubular member 89 is attached, in which is slidably arranged a spindle 90, provided upon its upper end with a stop 91 and near to its lower end with a disk 92. Against this disk and the bracket 88 bears a spring 93, tending to force the spindle 90 downward into the recesses of the star wheel 62. The distance between the longitudinal axes of the plunger 69 and the spindle 90 is equal to the distance between two neighboring recesses in the star wheel 62. When therefore the plunger 69 is forced downward to press a sealing disk into the metal cap beneath it, the spindle 90 will be forced into the neighboring recess of the star wheel. If an assembled crown cork is in this recess, the spring 93 will be compressed by the upward movement of the spindle 90. If, however, only a sealing disk is seated in the recess, the spindle 90 will force the same through an opening 94 in the table into a receptacle below said opening, for the reason that the tension of the spring 93 is greater than the resistance offered by the sealing disk in the recess.

The assembled crowns slide down an inclined passage 95 to the uniting head 96. This head comprises a rotary drum 97, keyed to a shaft 98, which is continuously driven from the main driving shaft 53. The drum is provided with a plurality of peripheral recesses 99, which are adapted to receive, one after the other, assembled crown corks from the passage 95. Plungers 100 are slidably arranged in the drum in alinement with the recesses, said plungers being located parallel with the longitudinal axis of the drum, and provided at their outer forked ends each with a pin 101, which engages slots 102 in radial arms 103, the inner ends of which are pivoted at 104 to the hub of the drum, while their upper free ends carry rollers 105, which are adapted to coact with a cam 106, attached to the frame of the machine. The arms 103 are engaged by the pointed ends 107 of spring pressed pins 108, which are slidably mounted on a ring 109, attached to the shaft 98. The cam 106 is arranged in the path of the rollers 105, whereby, as the drum 97 rotates, the plungers 100 will be forced against the action of the springs 110 upon the pins 108 out of the recesses 99 in the drum before they arrive opposite to the passage 95. When a recess arrives at this point, a crown cork will slide into the same, and after the corresponding roller 105 is disengaged from the cam, the spring 110 will force the plunger against the assembled crown cork, placing thereby the parts of the closure under compression, and holding it in this condition until the closure makes very nearly a full revolution around the shaft 98, when the roller of the plunger again arrives at the cam 106, whereby the plunger is disengaged from the closure, allowing the closure to be guided by a projection 111 into a chute 111'. It is obvious that the binding disk in the closure is still in its fused or softened condition when arriving in a recess of the drum 97, so that this binding medium, due to the pressure, will firmly unite the parts of the closure, the binding medium being partly or wholly hardened when the closure is discharged into the chute 111'. It is to be noted that an intimate union is formed between the sealing disk and the metal cap as there is no air between the said two parts to prevent such union. The sealing disk, on the other hand, is in its original tough condition, as it has not been subjected to the influence of the heating means upon the machine. A tongue 112 is pivoted at 113 to a stationary part of the frame, its free end being provided with a pin 114, engaging an arc-shaped slot 115 in the frame. A spring 116 forces the tongue 112 into contact with the drum, so that closures, which are not properly seated in their recesses, will be forced into the same before the plunger engages them.

Motion is imparted to the entire mechanism through the intermediary of a pulley 117, which is keyed to the main driving shaft 53. The shaft 24' of the continuously rotating disk 24 is driven by a belt 118, running over pulleys 119 and 120, attached to the shafts 24' and 53, respectively. The shafts 29 and 63 are driven by worms 120', 120' upon the main driving shaft 53, engaging worm gears 121, 121 upon the shafts 29 and 63. The worms 120' have straight portions 122, and while these are engaging the worm gears 121, 121, the latter are at rest. When the inclined portions 123 of the worms 120' coact with a tooth of the worm gears, the same will be rotated a given distance, whereby the star wheels will transport the crowns a corresponding distance. The star wheel 58 may be either driven continuously from the shaft 53, or driven by the star wheel 62 through the intermediary of the metal caps engaged by both wheels. The shaft 98 is rotated also from the main shaft 53, the connection between these two shafts has, however, not been shown, as it would complicate too much the drawing.

What I claim is:—

In a process for the manufacture of bottle closures of the cap variety, which consists, first, in placing a fusible binding medium into the metallic cap, second, heating the metallic cap and binding medium for properly fusing the latter, third, depositing a sealing disk into the cap on top of the fused binding medium, and, fourth, subjecting the assembled closure to pressure while the binding material is hardening.

Signed at New York, in the county of New York and State of New York, this 28th day of July, A. D. 1911.

ALEX. BOGDÁNFFY.

Witnesses:
SIGMUND HERZOG,
S. BIRNBAUM.